(No Model.)
W. S. BLAKE.
TOBACCO PIPE BOWL.
No. 387,041. Patented July 31, 1888.
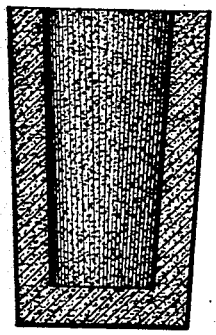
Attest:
E. Arthur
H. S. Knight
Inventor:
Walter S. Blake.
By Knight Bro.
Attys

UNITED STATES PATENT OFFICE.

WALTER S. BLAKE, OF ST. LOUIS, MISSOURI, ASSIGNOR TO THE BLAKE PIPE COMPANY, OF SAME PLACE.

TOBACCO-PIPE BOWL.

SPECIFICATION forming part of Letters Patent No. 387,041, dated July 31, 1888.

Application filed January 7, 1888. Serial No. 260,115. (No model.)

*To all whom it may concern:*

Be it known that I, WALTER S. BLAKE, a citizen of the United States, residing at St. Louis, in the State of Missouri, have invented a new and useful Improvement in Tobacco-Pipe Bowls, of which the following is a specification.

My composition consists of the following ingredients combined in or about the following proportions: finely ground corn-cobs, eighty-five parts; silicate of soda, five parts; and I prefer to use ten parts of earthy material—such as calcined magnesia, plaster-of-paris, kaolin chalk, lime, clay, &c.—capable of combining or bonding with silicate of soda (natural or diluted with water) the particles of corn-cob together, and forming a solid substance.

The accompanying drawing represents a vertical section of a pipe-bowl made according to my invention.

The ground cob is to be thoroughly mixed while dry with the earthy material, (when used,) and the silicate of soda (natural or diluted with water) is forced through the mass under pressure.

In the process of manufacturing these pipe-bowls and to carry my invention into effect I take a sufficient quantity of the ground cob and earthy material (when used) and after they have been thoroughly mixed to nearly fill the molds in which the bowls are formed. I then pour in a sufficient quantity of silicate of soda (natural or diluted) over the top, and a closely-fitting plunger is forced down upon the mass, which forces the silicate of soda through the mass and at the end of its stroke presses the pipe-bowl into shape. The bowl is then taken from the mold and allowed to harden, after which the outside may be coated with silicate of soda, (colored or uncolored, as desired,) which gives the outside of the pipe-bowl a hard glossy finish. The inside of the bowl may then be coated with a mixture of one part of calcined magnesia and one part of kaolin made into a thin paste by the addition of a sufficient quantity of silicate of soda. The stem-hole is then bored and the bowl is completed.

In the application of the above process I prefer to use calcined magnesia in combination with the ground cob and silicate of soda, on account of its being free from any unpleasant taste or smell, and at the same time combines the properties of corn cob and meerschaum together, forming a cheap and agreeable pipe to smoke and well adapted to absorbing the nicotine, &c., let from the tobacco.

What I claim, and desire to secure by Letters Patent of the United States, is—

1. A composition for the manufacture of pipe-bowls, consisting of ground corn-cob and silicate of soda, substantially as set forth.

2. A composition for the manufacture of pipe-bowls, consisting of ground corn-cob, earthy material, and silicate of soda, substantially as set forth.

WALTER S. BLAKE.

In presence of—
GEO. H. KNIGHT,
EDWD. S. KNIGHT.